United States Patent
Kim et al.

(10) Patent No.: US 9,126,331 B2
(45) Date of Patent: Sep. 8, 2015

(54) MOVING APPARATUS AND DOCKING METHOD BETWEEN MOVING APPARATUSES

(75) Inventors: Sangwhee Kim, Seongnam-si (KR); Young-Il Shin, Daejeon (KR); Seong Ho Cho, Daejeon (KR); Eunjung Kim, Daejeon (KR); Youngjun Park, Daejeon (KR); Jinhyung Park, Daejeon (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 69 days.

(21) Appl. No.: 13/824,940

(22) PCT Filed: Aug. 2, 2011

(86) PCT No.: PCT/KR2011/005688
§ 371 (c)(1),
(2), (4) Date: Mar. 18, 2013

(87) PCT Pub. No.: WO2012/060541
PCT Pub. Date: May 10, 2012

(65) Prior Publication Data
US 2013/0206956 A1 Aug. 15, 2013

(30) Foreign Application Priority Data
Nov. 1, 2010 (KR) ........................ 10-2010-0107709

(51) Int. Cl.
*F16M 11/00* (2006.01)
*B25J 5/02* (2006.01)
(Continued)

(52) U.S. Cl.
CPC *B25J 5/02* (2013.01); *B25J 9/0078* (2013.01); *B63B 21/00* (2013.01); *B66D 1/30* (2013.01); *Y10S 901/01* (2013.01); *Y10T 29/49826* (2015.01)

(58) Field of Classification Search
USPC ......... 248/419, 420, 424, 429, 430, 637, 674, 248/675
See application file for complete search history.

(56) References Cited

U.S. PATENT DOCUMENTS 5,443,312 A * 8/1995 Schluter .................... 312/334.27
6,224,128 B1 * 5/2001 Mains .......................... 296/37.6
(Continued)

FOREIGN PATENT DOCUMENTS

JP 04-289085 A 10/1992
JP 05-034096 U 5/1993
(Continued)

OTHER PUBLICATIONS

International Search Report dated Dec. 20, 2011 of PCT/KR2011/005688 which is the parent application—4 pages.
(Continued)

*Primary Examiner* — Steven Marsh
(74) *Attorney, Agent, or Firm* — Knobbe Martens Olson & Bear, LLP

(57) ABSTRACT

A moving apparatus includes: robot guiding rails extended in a first direction to guide the working robot, and including first and second ends; first rollers included at a vicinity of the first end of the robot guiding rail and having a rotation axis in a second direction perpendicular to the first direction; hook arms included at the vicinity of the first end of the robot guiding rail, and including hooks extended in the first direction and facing upwardly; hook latches included at a vicinity of the second end of the robot guiding rail, positioned at a position corresponding to the hook arm, and latched by the hooks of the hook arms at lower sides thereof; and docking guiding rails included at the vicinity of the second end of the robot guiding rail, extended in the first direction, and having an upper surface for guiding the first roller.

17 Claims, 20 Drawing Sheets

(51) Int. Cl.
*B63B 21/00* (2006.01)
*B66D 1/30* (2006.01)
*B25J 9/00* (2006.01)

(56) References Cited

U.S. PATENT DOCUMENTS

| | | | | |
|---|---|---|---|---|
| 6,254,047 | B1* | 7/2001 | Dedrick | 248/298.1 |
| 2009/0236487 | A1* | 9/2009 | Shi et al. | 248/424 |
| 2013/0049276 | A1* | 2/2013 | Fregeau | 269/56 |

FOREIGN PATENT DOCUMENTS

| | | |
|---|---|---|
| JP | 05-228883 A | 9/1993 |
| JP | 07-144273 A | 6/1995 |
| JP | 10-306578 A | 11/1998 |
| JP | 11-333592 A | 12/1999 |
| JP | 3848433 B2 | 11/2006 |
| JP | 2007-137254 A | 6/2007 |
| JP | 2010-253518 A | 11/2010 |
| KR | 10-2009-0124142 A | 12/2009 |
| KR | 10-2010-0111183 A | 10/2010 |
| KR | 10-2010-0111186 A | 10/2010 |
| WO | 2010/117162 A2 | 10/2010 |

OTHER PUBLICATIONS

Search Report dated Apr. 14, 2015, of corresponding Chinese Patent Application No. 201180052530.5—2 pages.

* cited by examiner

MOVING APPARATUS AND DOCKING METHOD BETWEEN MOVING APPARATUSES

TECHNICAL FIELD

The present invention relates to a moving apparatus, and a docking method between moving apparatuses.

BACKGROUND ART

A size of a vessel is much larger and more complex than a general structure, such that the vessel goes through a process of manufacturing a lot of members and base materials in the unit of a block, and then assembling them. When a ship block is manufactured, operations, such as welding, painting, and an examination, are performed by using a working robot, and a self-controlling moving apparatus for moving the working robot within the block by using a wire has been developed.

An operation for one block is performed by dividing the one block into a plurality of cells, installing one self-controlling moving apparatus in each cell, and moving and loading the working robot into the self-controlling moving apparatus. In order to move and load the working robot from one moving apparatus into another moving apparatus, first, the moving apparatus needs to be docked through an entrance formed between the cells. A docking means in the related art generally uses an engagement method of a bolt and a nut.

However, in the method of using the bolt and the nut, when a foreign material is caught in a screw portion, the docking may be difficult, and a space occupied by a docking module in the entrance is large, so that a clearance space in which the working robot is movable may be decreased.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a moving apparatus for which docking is easy and which occupies a small space.

Technical Solution

An exemplary embodiment of the present invention provides a moving apparatus on which a working robot working in a working space is mountable, the moving apparatus including: a pair of robot guiding rails extended in a first direction to guide the working robot, and including a first end and a second end as both ends; a pair of first rollers included at a vicinity of the first end of the robot guiding rail and having a rotation axis in a second direction perpendicular to the first direction; a pair of hook arms included at the vicinity of the first end of the robot guiding rail, and including hooks extended in the first direction and facing upwardly; a pair of hook latches included at a vicinity of the second end of the robot guiding rail, positioned at a position corresponding to the hook arm, and latched by the hooks of the hook arms at lower sides thereof; and a pair of docking guiding rails included at the vicinity of the second end of the robot guiding rail, extended in the first direction, aligned with the first roller, and having an upper surface for guiding the first roller.

The first roller may be shaped like a wedge having a concave center.

The upper surface of the docking guiding rail may include a guiding portion for limiting a position of the first roller in the first direction.

The guiding portion may include an oblique portion declining from the second end of the robot guiding rail in a direction toward the first end; and a termination portion starting from an end of the oblique portion and rising upwardly.

The termination portion may have a shape of a circular arc.

A height of a boundary point of the termination portion and the oblique portion may be smallest in the guiding portion.

A distance from the hook to a rotation axis of the first roller in the first direction may be the same as a distance from the hook latch to the boundary point in the first direction, and a distance from the rotation axis of the first roller to a front end of the robot guiding rail in the first direction may be the same as a distance from the boundary point to a rear end of the robot guiding rail in the first direction.

The first roller and the hook arm may protrude outwardly from the first end of the robot guiding rail in the first direction, and the hook latch and the docking guiding rail may not be separated from the second end of the robot guiding rail in the first direction.

The hook latch may have a recess receiving the hook of the hook arm.

The moving apparatus may include; a main body; and a first module coupled with the main body, and including the first roller and the hook arm, in which the robot guiding rail may include a first portion and a second portion formed on upper surfaces of the main body and the first module, respectively.

The first module may include: a fixing part fixed to the main body; and a moving part fixed to the second portion of the robot guiding rail and movable with respect to the main body, in which the moving part may include the first roller and the hook arm.

The main body may include: a wire having one end fixed to the moving part; a winch configured to wind the wire; and a motor configured to rotate the winch.

The fixing part may include: a pair of fixing members fixed to a side surface of the main body, and including a triangular hole having an oblique side declining as becoming far from the main body; and a sliding member positioned between the pair of fixing members, and including an oblique surface declining as becoming far from the main body, and the moving part may further include: a pair of second rollers passing through the triangular hole of the fixing member, and having a rotation axis in the second direction; and a ball caster installed at a position corresponding to the sliding member.

A center of gravity of the moving part may be positioned between the first roller and the second roller.

The oblique side of the triangular hole has a larger inclination than those of the oblique surface of the sliding member and the oblique portion of the docking guiding rail.

The moving apparatus may further include: a second module coupled with the main body at an opposite side to the first module with respect to the main body, and including the hook latch and the docking guiding rail, in which the robot guiding rail may further include a third portion included in an upper surface of the second module.

The robot guiding rail may further include a fourth portion included in a bottom surface of the main body, in which the second module is rotatable with respect to the main body, and when the second module rotates with respect to the main body by 180 degrees, the third portion and the fourth portion of the robot guiding rail are connected to each other.

Another exemplary embodiment of the present invention provides a docking method between moving apparatuses, including: making a first moving apparatus including a main body and a docking module approach an upper portion of the second moving apparatus; making a moving part be in contact with a docking guiding rail of the second moving apparatus by rotating the moving part of the docking module; positioning a latch of the moving part at a lower portion of a hook latch of the second moving apparatus by obliquely moving the moving part along the docking guiding rail; stopping movement of the moving part following the docking guiding rail; and moving up the hook and latching the hook to the hook latch by moving down the first moving apparatus and inversely rotating the moving part.

The docking module may further include a fixing part fixed to the main body in addition to the moving part, and the moving part may be connected with the main body through a wire.

The approach operation may be performed in a state where the wire is wounded, and the rotation operation and the moving operation may be continuously performed by gradually loosening the wire.

The rotation operation, the moving operation, and the inverse rotation operation may be performed by gravity of the moving part.

The rotation operation may include rotating the moving part with respect to a rotation axis of a supporting roller of the moving part coupled to a supporting member of the fixing part.

The moving operation may include rolling a wedge-type roller of the moving part along an oblique portion of the docking guiding rail by the gravity of the moving part.

The rotation operation may further include making a ball caster of the moving part be in contact with a sliding member of the fixing part, and the moving operation may further include sliding down the ball caster along an oblique surface of the sliding member.

The stopping operation may include stopping movement of the wedge-type roller at a termination portion shaped like a circular arc formed at an end of the oblique portion of the docking guiding rail.

The inverse rotation operation may include: making the ball caster be spaced apart from the sliding member by moving down the first moving apparatus; and inversely rotating the moving part with respect to the wedge-type roller.

The docking method may further include making the main body approach the moving part after the inverse rotation operation.

Advantageous Effects

According to the moving apparatus according to the exemplary embodiment of the present invention, the docking is easily performed, and the moving apparatus occupies a small space, so that it is possible to decrease a time for docking and improve docking performance.

DESCRIPTION OF SYMBOLS

Figure 1:
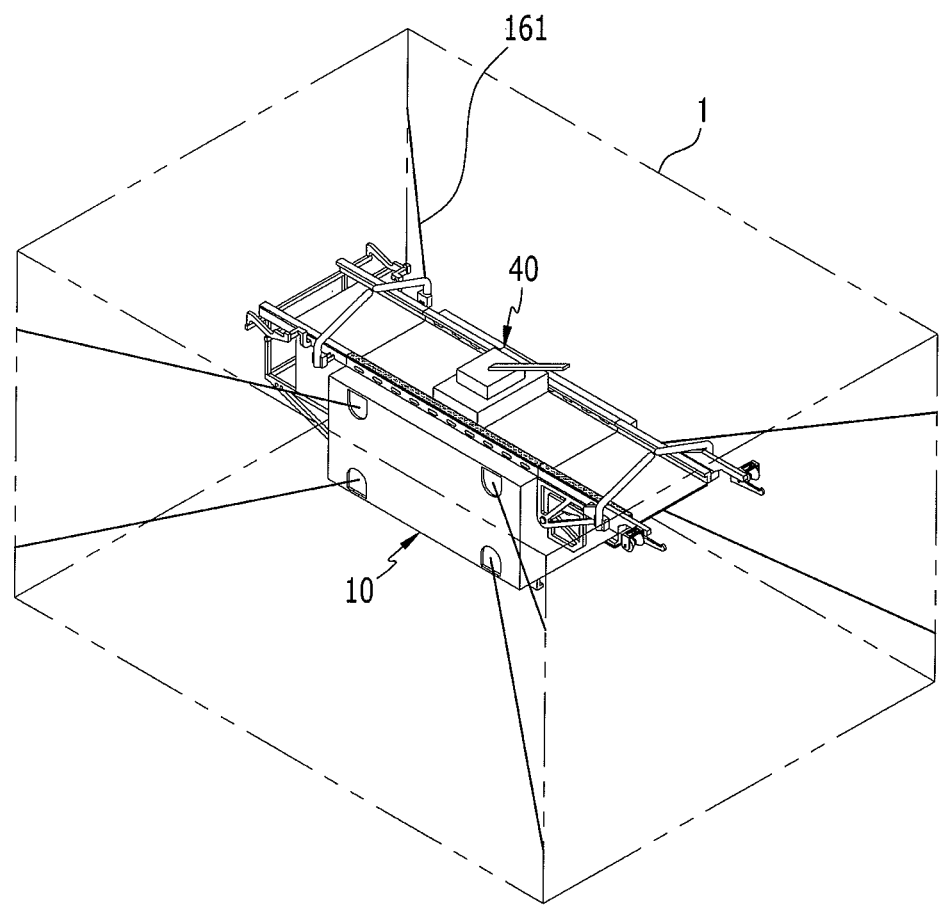
FIG. 1 is a perspective view schematically illustrating a form in which a moving apparatus according to an exemplary embodiment of the present invention is installed inside a ship block.

1: Ship block
2, 3: Cell of ship block
5, 6, 7: Entrance
10, 20, 30: Moving apparatus
40: Working robot
100: Main body
110: Main body housing
112, 114: Through-hole
140: Control unit
160: Moving means driving unit
170: Docking module driving unit
171: Wire
172: Winch
173, 174: Spur gear
175, 182: Motor
176: Pulley
177: Fixing member of pulley
180: Rotary module driving unit
184: Decelerator
200: Docking module
210: Roller arm
220: Hook arm
222: Arm portion of hook arm
224: Hook portion of hook arm
230: Wedge-type roller 232: Outer circumference of wedge-type roller
234: Center circumference of wedge-type roller
236: Insertion pole of wedge-type roller
240: Fixing member of wedge-type roller
250: Supporting roller
255: Supporting member
260: Fixing member
262: Triangular hole of fixing member
264: Oblique side of triangular hole of fixing member
270: Sliding member
274: Oblique surface of sliding member
275: Ball caster
280, 380: Gate member
290: Bottom plate
300: Rotary module
310: Rotary module frame
320: Hook latch
321-324: first to fourth poles of hook latch
326: Recess of hook latch
330: Docking guiding rail
332: guiding portion of docking guiding rail
334: Oblique portion of guiding portion of docking guiding rail
336: Termination portion of guiding portion of docking guiding rail
338: Start portion of guiding portion of docking guiding rail
350: Container
360: Rotation assistant member
400: Robot guiding rail
450: Fixing assistant member

MODE FOR INVENTION

Then, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

First, an entire structure of a moving apparatus according to an exemplary embodiment of the present invention will be described in detail with reference to FIGS. 1 and 2.

Figure 2:
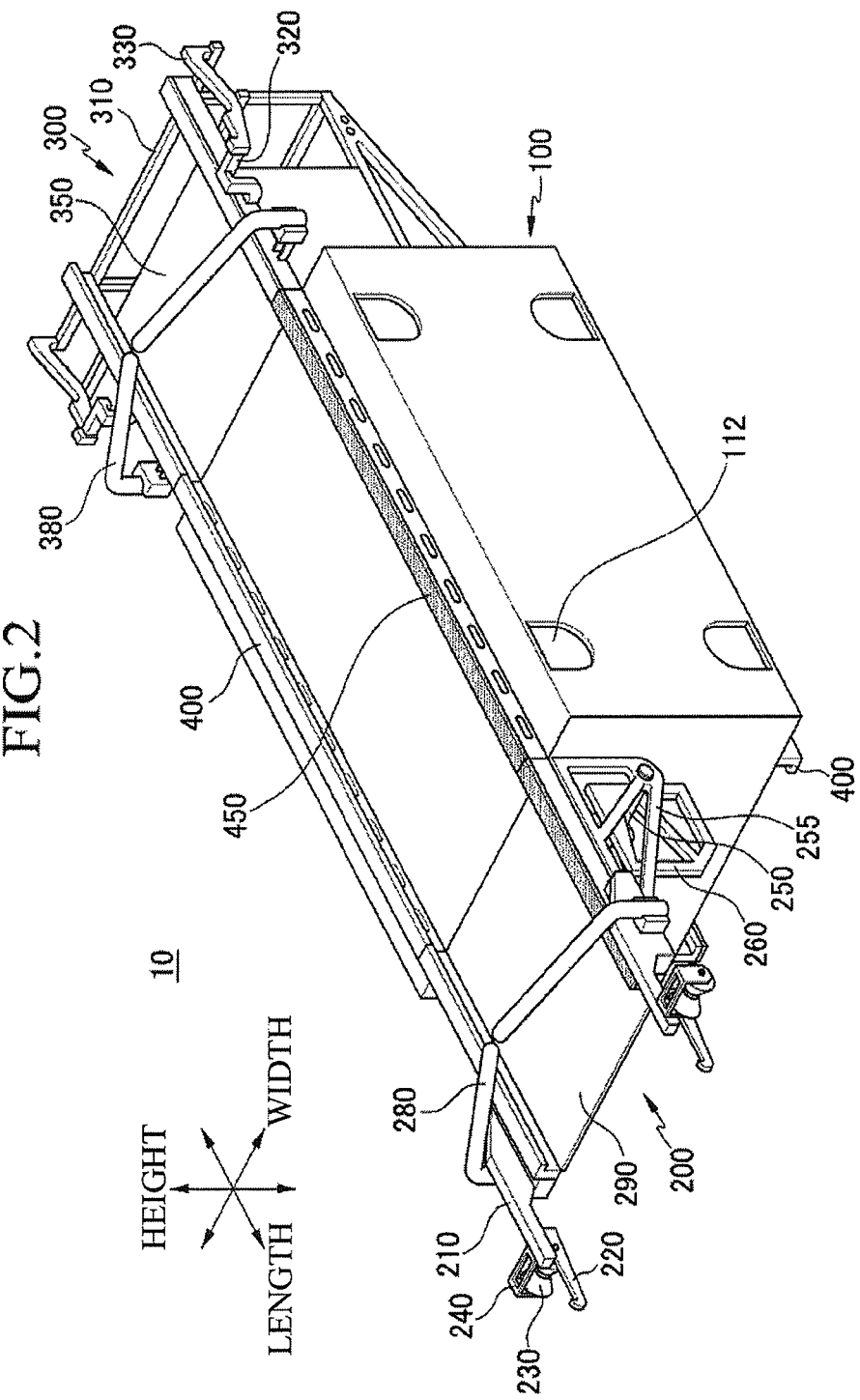
FIG. 2 is a perspective view of the moving apparatus according to the exemplary embodiment of the present invention.

FIG. 1 is a perspective view schematically illustrating a form in which the moving apparatus according to the exemplary embodiment of the present invention is installed inside a ship block, and FIG. 2 is a perspective view of the moving apparatus according to the exemplary embodiment of the present invention.

Referring to FIG. 1, the moving apparatus 10 according to the exemplary embodiment is an apparatus, which is installed in a working space, and allows a working robot 40 to be mounted and moves the working robot 40 to a designated position, thereby enabling the working robot 40 to perform work at the position. In this case, the working space of the moving apparatus 100 may be, for example, an inside or an outside of the ship block 1. However, the working space of the moving apparatus is not limited thereto. In the exemplary embodiment, a case where the moving apparatus 100 is worked inside the ship block will be described as an example.

In the meantime, the work performed by the working robot 40 needs to be performed in the working space, and may include various works performable by the robot. In the exemplary embodiment, a case where the working robot 40 performs work of painting the inside of the ship block 1 will be described as an example.

In the exemplary embodiment, the moving apparatus 10 is installed inside the ship block 1 through a plurality of wires 161, and a position of the moving apparatus 10 inside the ship block 1 may be changed by adjusting a length of the wire 161.

Referring to FIG. 2, the moving apparatus 10 of the exemplary embodiment includes a main body 100 and a docking module 200 and a rotary module 300 coupled to both ends of the main body 100.

The main body 100 may have an appearance shaped like an approximate cuboid, and particularly, may have a flat upper surface, but a shape thereof is not limited thereto. Upper surfaces of the docking module 200 and the rotary module 300 may be flat, and may be connected on the same surface as the upper surface of the main body 100.

A pair of robot guiding rails 400 facing each other is fixed to the upper surface and a lower surface of the main body 100, the upper surface of the docking module 200, and the upper surface of the rotary module 300, and a fixing assistant member 450 is formed on one robot guiding rail 400 in the pair of the robot guiding rails 400. Parts of the robot guiding rails 400 installed in the main body 100, the docking module 200, and the rotary module 300 may be separated from each other.

As illustrated with a bidirectional arrow of FIG. 2, it is defined that a direction of a long side of the main body 100 is a longitudinal direction, and a direction of a short side of the upper surface and the lower surface is a width direction, and a direction of a vertical side is a height direction below for convenience of the description. Further, it is defined that a side toward the docking module 200 in the longitudinal direction is a front side, a side toward the rotary module 300 is a rear side, and a direction toward a space between the two robot guiding rails 400 in the width direction is an inside, and an opposite direction thereof is an outside. The longitudinal direction, the width direction, and the height direction are substantially orthogonal to each other.

The rotary module 300 may rotate with respect to a rotation axis parallel to the longitudinal direction, and a part of the robot guiding rail 400 of the rotary module 300 after a rotation at 180 degrees is connected with the part of the robot guiding rail 400 included in the lower surface of the main body 100.

The working robot 40 moves on the upper surface or the lower surface of the moving apparatus 100 along the robot guiding rails 400, and is fixed to a specific position of the upper surface or the lower surface of the moving apparatus 10 by a fixing member (not illustrated) according to necessity.

The fixing member is coupled with the working robot 40, the fixing assistant member 450, and the robot guiding rail 400 thereunder, and the fixing assistant member 450, which serves to enhance frictional force so as to prevent the fixing member from moving, is formed of fur, or the like.

Then, the structures of the main body 100, the docking module 200, and the rotary module 300 in the moving apparatus 10 according to the exemplary embodiment will be described in detail with reference to FIGS. 3 to 16 together with FIGS. 1 and 2.

Figure 3:
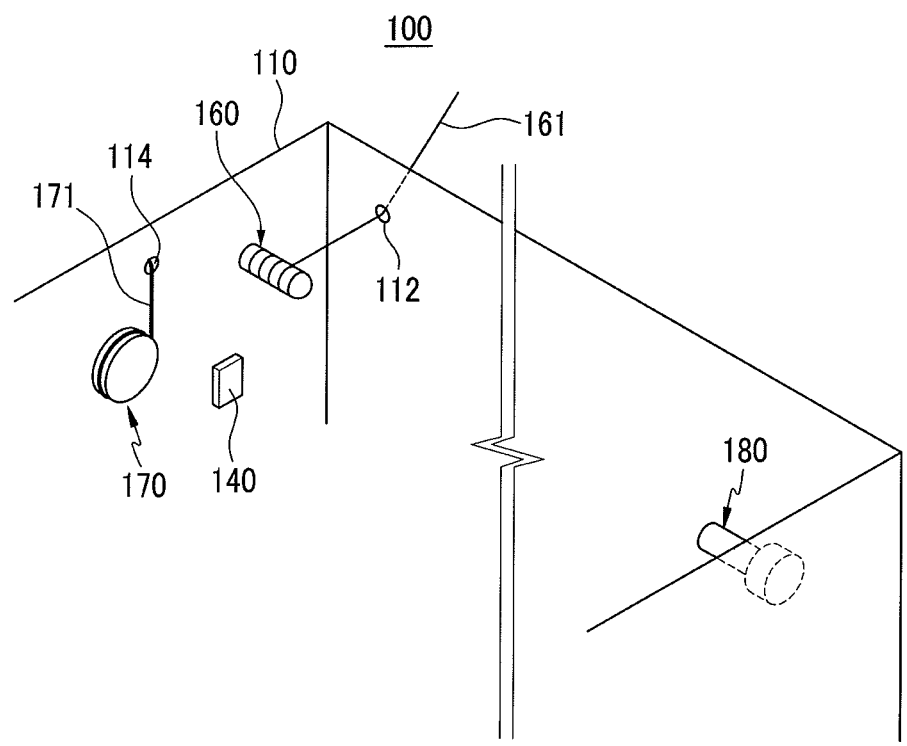
FIG. 3 is a perspective view schematically illustrating an internal structure of a main body in the moving apparatus according to the exemplary embodiment.
Figure 4:
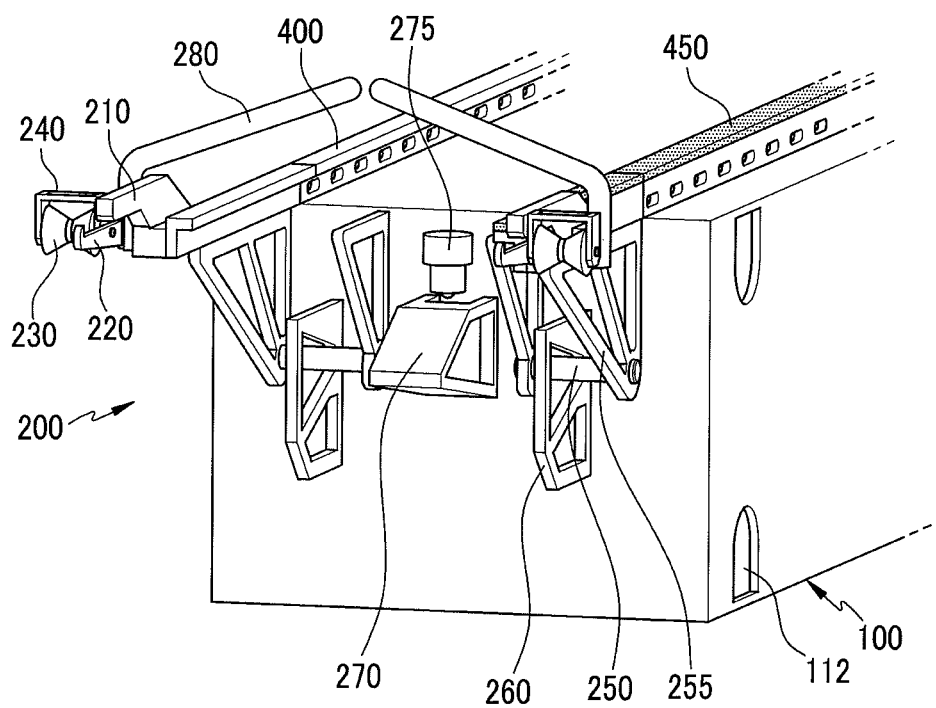
FIG. 4 is a perspective view of a docking module.
Figure 5:
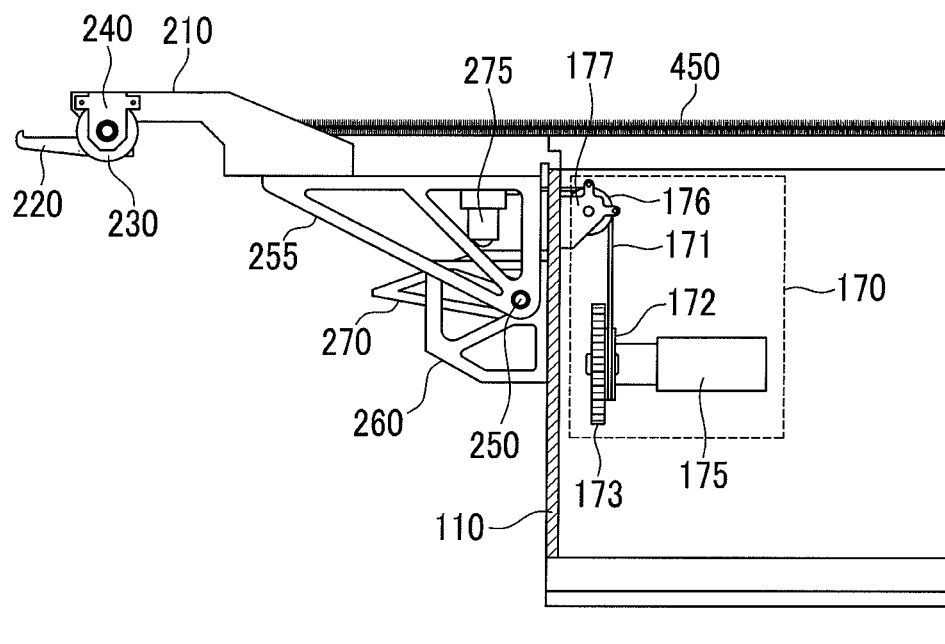
FIG. 5 is a side view of the docking module and a docking module driving unit.
Figure 6:
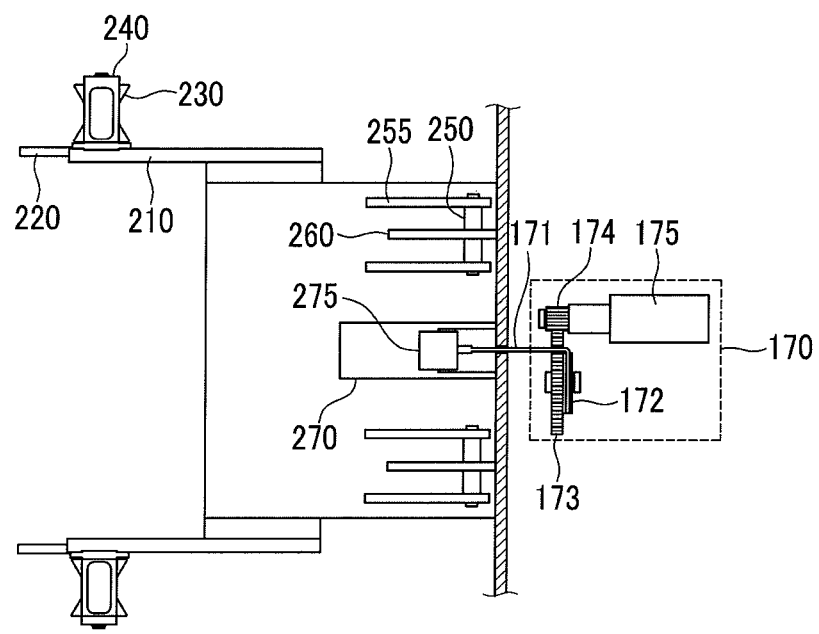
FIG. 6 is a top plan view of the docking module and the docking module driving unit.
Figure 7:
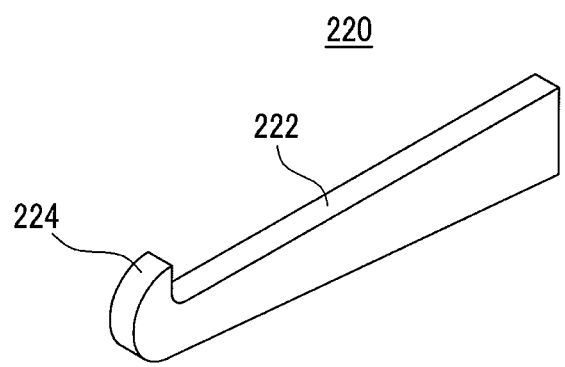
FIG. 7 is a perspective view illustrating a hook arm of the docking module.
Figure 8:
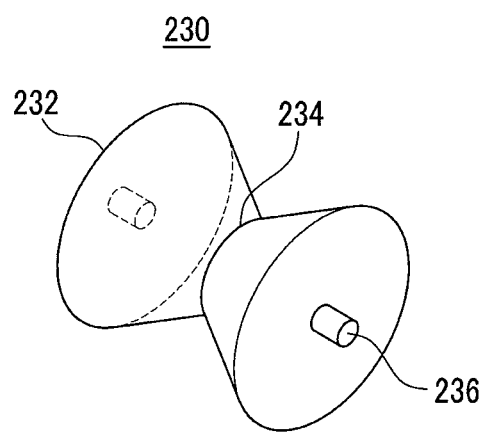
FIG. 8 is a perspective view illustrating a wedge-type roller of the docking module.

FIG. 3 is a perspective view schematically illustrating an internal structure of the main body in the moving apparatus according to the exemplary embodiment. FIG. 4 is a perspective view of the docking module. FIG. 5 is a side view of the docking module and a docking module driving unit. FIG. 6 is a top plan view of the docking module and the docking module driving unit. FIG. 7 is a perspective view illustrating a hook arm of the docking module. FIG. 8 is a perspective view illustrating a wedge-type roller of the docking module.

Figure 9:
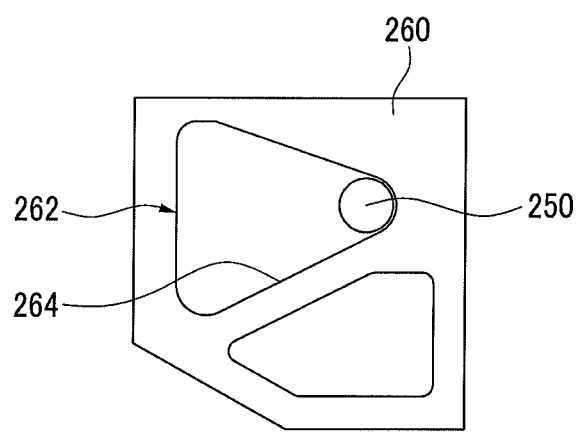
FIG. 9 is a side view illustrating a fixing member of the docking module.
Figure 10:
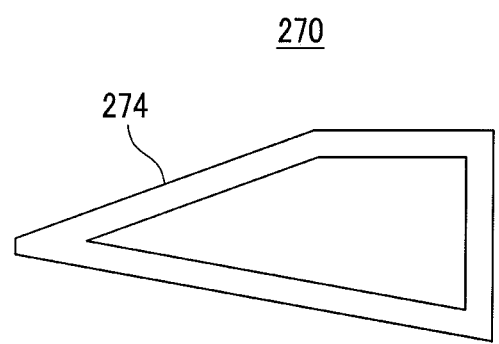
FIG. 10 is a side view illustrating a sliding member of the docking module.
Figure 11:
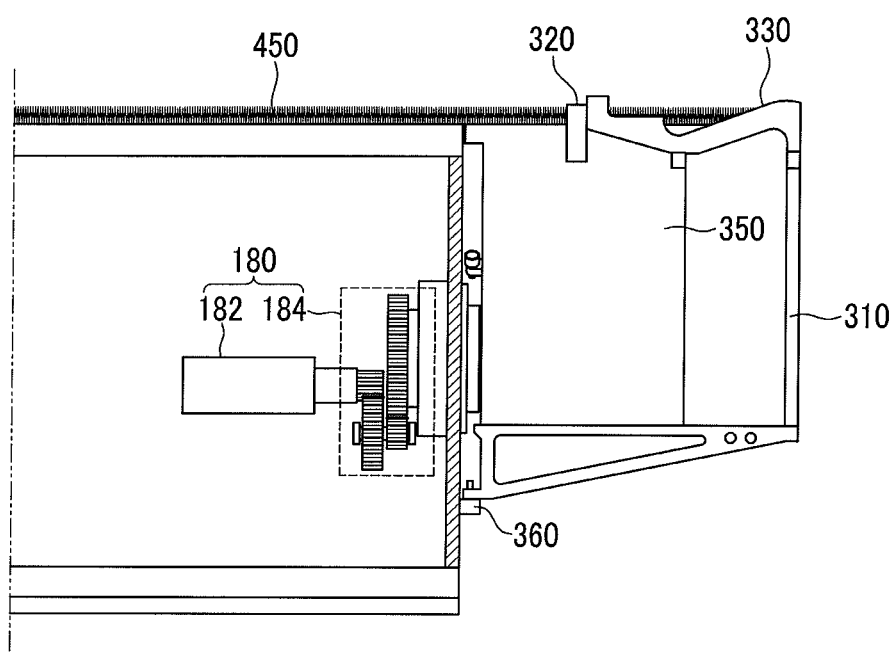
FIG. 11 is a side view of a rotary module and a rotary module driving unit.
Figure 12:
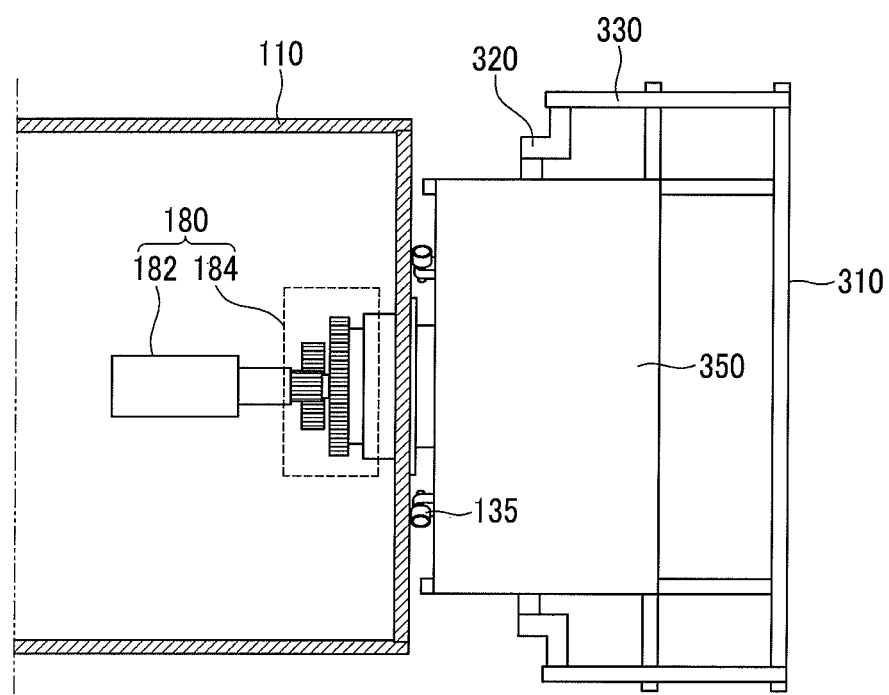
FIG. 12 is a top plan view of the rotary module and the rotary module driving unit.
Figure 13:
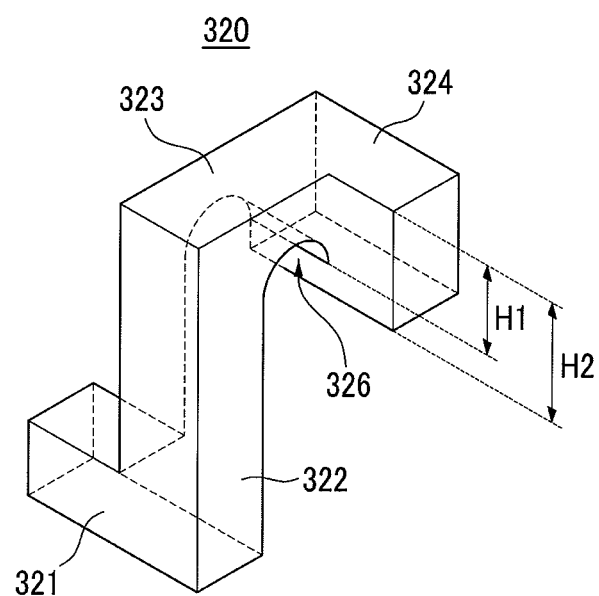
FIGS. 13 to 15 are a perspective view, a front view, and a side view illustrating a hook latch of the rotary module, respectively.
Figure 14:
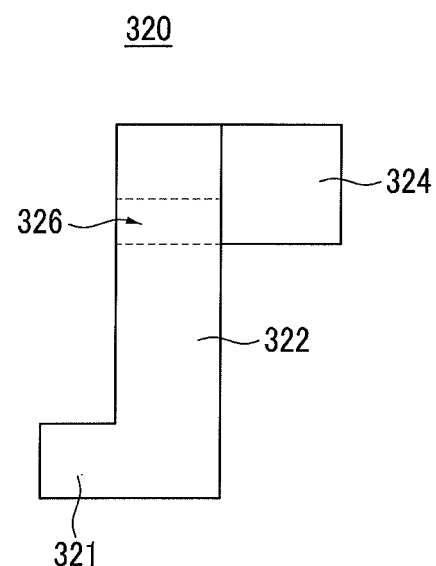
Figure 15:
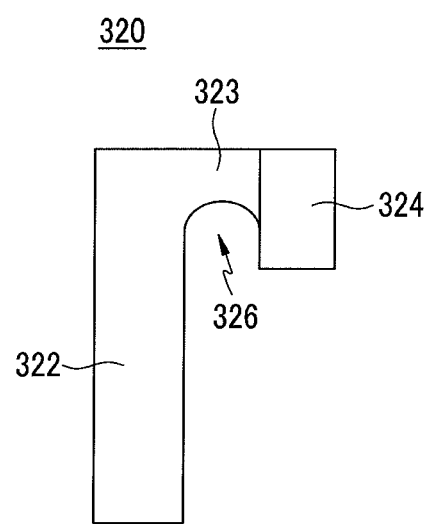
Figure 16:
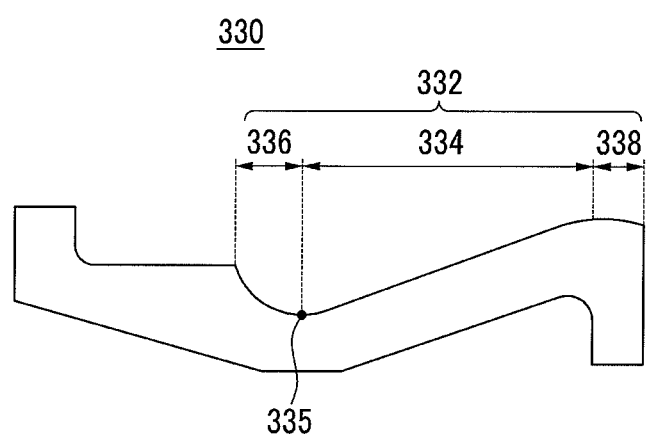
FIG. 16 is a side view illustrating a docking guiding rail of the rotary module.

FIG. 9 is a side view illustrating a fixing member of the docking module. FIG. 10 is a side view illustrating a sliding member of the docking module. FIG. 11 is a side view of the rotary module and a rotary module driving unit. FIG. 12 is a top plan view of the rotary module and the rotary module driving unit. FIGS. 13 to 15 are a perspective view, a front view, and a side view illustrating a hook latch of the rotary module, respectively. FIG. 16 is a side view illustrating a docking guiding rail of the rotary module.

Referring to FIG. 3, the main body 100 includes a housing 110, a moving means driving unit 160, a rotary module driving unit 180, a docking module driving unit 170, a control unit 140, and the like.

The moving means driving unit 160 is a part for driving a moving means for moving the moving apparatus 10, and as described above, the moving means of the moving apparatus 10 according to the exemplary embodiment is the plurality of wires 161.

The moving means driving unit 160 is fixed to the housing 110 or a frame (not illustrated) therein, and may include a winch around which the wire 161 is wound, and a motor for rotating the winch.

Referring to FIG. 1, an opposite end of the wire 161 connected to the moving means driving unit 160 of the moving apparatus 10 is fixed to the ship block 1 while passing through a through-hole 112 formed at the housing 110.

The number of wires 161 needs to be six or more so that the moving apparatus 10 vertically and horizontally moves, and the number of moving means driving units 160 and through-holes 112 is the same as that of the wires 161.

Particularly, in order for the moving apparatus 10 to move around every nook and corner inside the ship block 1 while maintaining a parallel state with respect to a bottom of the ship block 1, the number of wires 161 may be eight or more.

A position of through-hole 112 may be changed according to the number of through-holes 112, a size of the ship block 1, and a size of the moving apparatus 10, and for example, when an appearance of the main body 100 of the moving apparatus 10 is a cuboid, and the number of through-holes is six, the through-holes 112 may be formed on six surfaces of the main body 100, respectively. As illustrated in the drawing, when the number of through-holes is eight, four through-holes may be formed on each of two side surfaces in the longitudinal direction among the four side surfaces of the main body 100, and one through-hole may be formed around each of the four corners of the side surface.

The position of the moving apparatus 10 inside the ship block 1 may be controlled by winding or releasing the respective wires 161 by using the moving means driving unit 160.

Each moving means driving unit 160 may be positioned at a position adjacent to the corresponding through-hole 112.

Referring to FIGS. 5 and 6, the docking module driving unit 170 is fixed to a wall surface of the housing 110 positioned at a side of the docking module 200 or the frame therein, and includes a wire 171, a winch 172, a pair of spur gears 173 and 174, a motor 175, a pulley 176, and a fixing member 177.

The wire 171 is wound around the winch 172, and passes through the through-hole 114 of the housing 110 via the pulley 176 coupled with the fixing member 177 fixed to the housing 110 or the frame, and an end of the wire 171 is fixed to the docking module 200.

The winch 172 loosens or winds the wire 171 through rotation by receiving power of the motor 175 through the pair of spur gears 173 and 174. The spur gears 173 and 174 are coaxially fixed to the winch 172 and the motor 175, respectively, and are engaged with each other.

Referring to FIGS. 11 and 12, the rotary module driving unit 180 is fixed to the wall surface of the housing 110 positioned at a side of the rotary module 300 or the frame therein, and includes the motor 182 and a decelerator 184 connected to the motor 182.

The decelerator 184 includes a plurality of gears of which axes are in parallel and which are engaged with each other, and is coupled to the rotary module 300 to transmit rotational force of the motor 182 to the rotary module 300, thereby rotating the rotary module 300.

Referring to FIG. 3 again, the control unit 140 may be installed inside or outside the housing 110, and controls the driving devices inside the main body 100, such as the moving means driving unit 160, the rotary module driving unit 180, and the docking module driving unit 170, according to an external signal.

Referring to FIGS. 2 to 6, the docking module 200 includes fixing parts 260 and 270 fixed to the main body 100, and moving parts 210, 220, 230, 240, 250, 255, 275, 280, and 290 movable based on the main body 100.

The moving parts 210, 220, 230, 240, 250, 255, 275, 280, and 290 are connected with the main body 100 by the wire 171, and may becomes far from or close to the main body 100 by releasing or winding the wire 171.

The fixing parts 260 and 270 are coupled to the moving parts 210, 220, 230, 240, 250, 255, 275, 280, and 290, and limit movement ranges of the moving parts 210, 220, 230, 240, 250, 255, 275, 280, and 290.

The moving parts 210, 220, 230, 240, 250, 255, 275, 280, and 290 are directly or indirectly fixed to the robot guiding rail 400.

Referring to FIG. 2, a bottom plate 290 is directly fixed to the robot guiding rail 400, and an upper surface thereof is flat, and may be substantially formed on the same plane as the upper surface of the main body 100. Although not illustrated in FIG. 2, a complex structure is formed under the bottom plate 290, and the bottom plate 290 is not illustrated in FIG. 4 for convenience of the description in order to clearly illustrate the complex structure, and a border thereof is only illustrated in FIG. 6. For the same reason, the robot guiding rails 400 and the fixing assistant member 450 are not illustrated in FIG. 6.

Referring to FIG. 4, a pair of gate members 280 is formed at both front side surfaces of the robot guiding rails 400.

The gate member 280 includes a vertical portion rotatably coupled to the side surface of the robot guiding rail 400, and an oblique portion bent from the vertical portion to obliquely face inwardly.

The gate member 280 prevents the working robot 40 mounted on the moving apparatus 10 from being separated to the outside of the moving apparatus 10 after passing the docking module 200.

Since the gate member 280 may rotate based on a center axis of the vertical portion, the oblique portion is opened toward the robot guiding rails 400 by rotating the gate members 280 at the time of the docking, so that the working robot 40 may move to another apparatus. The gate members 280 are not illustrated in FIGS. 5 and 6 for convenience.

A pair or roller arms 210 is fixed to front ends of the both robot guiding rails 400, and hook arms 220 are fixed under ends of the roller arms 210, respectively.

The roller arm 210 and the hook arm 220 extend in the longitudinal direction, and the hook arm 220 more protrudes than the roller arm 210 in the front direction. The hook arm 220 may be positioned at a slightly outer side than the roller arm 210.

Referring to FIG. 7, the hook arm 220 includes an arm portion 222 extended in the longitudinal direction, and a hook portion 224 bent upwardly from an end of the arm portion 222.

The upper surface of the arm portion 222 may maintain a flat and parallel state, and a point at which the arm portion 222 meets the hook portion 224 may be processed to be round.

The hook arm 220 may be directly fixed to the roller arm 210, and may be indirectly coupled to the roller arm 210 through another member.

Roller coupling members 240 are fixed to the ends of the roller arms 210, respectively, and wedge-type rollers 230 having a rotation axis in the width direction are coupled to the roller coupling members 240.

Referring to FIG. 8, the wedge-type roller 230 has a shape in which upper surfaces of a pair of truncated corns face each other, and an outer circumference 232 thereof is the largest, and a center circumference 234 is the smallest. However, contrary to this, the wedge-type roller 230 may have a form in which a pair of truncated corns is connected with a cylinder interposed therebetween.

An insertion pole 236, which has the center axis as the center and is shaped like a cylinder is formed in the wedge-type roller 230, to be rotatably inserted in the roller coupling member 240. Contrary to this, the wedge-type roller 230 may have a shape in which a through-hole passing through a vicinity of the center axis of the wedge-type roller 230 is formed and the insertion pole 235 is inserted inside the through hole.

The wedge-type roller 230 further protrudes than a front end of the robot guiding rail 400 in the front direction, and may be positioned at an external side of the hook arm 220.

Two pairs of supporting members 255 are fixed to the bottom surface of the bottom plate 290, and one pair of supporting members 255 is positioned at each of both sides.

Each supporting member 255 is shaped like an approximate inverted right-angled triangle, and a bottom side thereof is fixed to the bottom plate 290, and a lateral side thereof is adjacent to the main body 100.

The two supporting members 255 positioned at the external side among the four supporting members 255 and the two supporting members 255 positioned at the internal side may have different shapes, and the two supporting members 255 positioned at the external side are larger than the two supporting members 255 positioned at the internal side in the drawing. However, the shapes of the supporting members 255 are not limited to the aforementioned description.

A hole is made around a corner at which an oblique side meets the lateral side at each supporting member 255, and both ends of a supporting roller 250 are inserted in the holes of each pair of supporting members 255.

Supporting rollers 250 may be rotated based on the rotation axis in the width direction, and the two supporting rollers 250 may be substantially laid on a straight line.

A ball caster 275 is also installed in the bottom surface of the bottom plate 290.

A position of the ball caster 275 in the width direction is a center point between the two supporting rollers 250, and a position of the ball caster 275 in the height direction is higher than the supporting roller 250.

The ball caster 275 is positioned slightly inwardly toward the docking module 200 from a boundary between the docking module 200 and the main body 100 in the longitudinal direction. An end of the wire 171 coming out from the main body 100 is fixed to an upper side of the ball caster 275.

A pair of fixing members 260 having a hole 262 (hereinafter, referred to as a "triangular hole") shaped like an approximate triangle is fixed to an external surface at the side of the docking module 200 of the main body 100.

Referring to FIG. 9, the triangular hole 262 includes a bottom side (hereinafter, referred to as "an oblique side") 264 inclined downwardly while becoming far from the main body 100, an upper side inclined upwardly opposite to the oblique side 264, and a vertical side connecting the two sides.

Each fixing member 260 is positioned between the pair of two supporting members 255, and the supporting roller 250 passes through the triangular hole 262 of the fixing member 260.

Corners of the triangular hole 262 are processed to be round, so that the supporting roller 250 may be in smooth contact with a surface of the triangular hole 262.

A sliding member 270 fixed to the main body 100 is included between the two pairs of fixing members 260.

Referring to FIG. 10, the sliding member 270 has an oblique surface 274 positioned at a position corresponding to the ball caster 275, and a gradient of the oblique surface 274 is smaller than a gradient of the oblique side 264 of the triangular hole 262 of the fixing member 260.

The center of gravity in the docking module 200 is positioned between the wedge-type roller 230 and the supporting roller 250.

A bracket having a V-shaped recess may be included in the docking module 200 or the main body 100 so as to prevent mis-alignment in a horizontal direction from being created between the docking module 200 and the main body 100.

Referring to FIGS. 2, 11, and 12, the rotary module 300 includes a frame 310 on which the robot guiding rail 400 is installed as a basic frame, and other parts included in the rotary module 300 are supported by the frame 310.

The frame 310 includes an external frame at the outside of a container 350 and an internal frame at the inside, and the external frame is illustrated in the drawing, but the internal frame is not illustrated in the drawing.

The internal frame and the external frame may be coupled to each other and fixed through a coupling member, such as a screw, with the container 350 interposed therebetween.

The internal frame is coupled with the decelerator 184 of the main body 100 to be rotatable based on a predetermined axis, and the external frame and the container 350 fixed to the internal frame may also rotate together with the internal frame. As a result, the frame 310 and other parts coupled or fixed to the frame 310 may also rotate based on the same axis.

An upper surface of the container 350 may be flat, and may be substantially positioned on the same plane as the upper surface of the main body 100.

A battery (not illustrated) for supplying electricity to the control unit 140 of the main body 100 and each driving device, that is, the moving means driving unit 160, the rotary module driving unit 180, and the docking module driving unit 170, may be included inside the container 350.

The battery may charge external electricity through the working robot 40 mounted on the moving apparatus 10.

A rotation assistant member 360 coupled so as to rotate with the internal frame and the container 350 is included outside the container 350. The rotation assistant member 360 may be in contact with the main body 100, and facing surfaces of the rotary module 300 and the main body 100 are not in contact with each other while maintaining a predetermined distance when the rotary module 300 is rotated, so that it is possible to prevent a problem of abrasion or incomplete rotation caused when the two surfaces are in contact with each other.

A pair of gate members 380 is attached at both side surfaces of the container 350 or external side surfaces of the both robot guiding rails 400.

A structure and an operation of the gate member 380 is almost the same as a structure and an operation of the gate member 280 of the docking module 200. However, the gate member 380 of the rotary module 300 is opened when the rotary module 300 is rotated, as well as when the docking is performed. The working robot 40 is moved on the rotary module 300 by opening the gate member 380 before the start of the rotation, and then the rotary module 300 is rotated by 180 degrees in a state where the working robot 40 is mounted, and in this case, the working robot 40 is also inverted by 180 degrees. Then, the work is performed on the bottom surface inside the ship block 1 by moving the working robot 40 to the bottom surface of the main body 100. The gate member 380 is not illustrated in FIGS. 11 and 12 for convenience.

A pair of hook latches 320 is included in both side surfaces of the container 350 (or the side surfaces of the external sides of the both robot guiding rails 400) and the rear side of the gate member 380, and the docking guiding rails 330 are included in ends of the hook latches 320, respectively.

The hook latch 320 has a shape extended toward the outside in the width direction when being viewed from the side surface of the container 350 and the robot guiding rail 400, and may be bent.

Referring to the example of FIGS. 13 to 15, the hook latch 320 is a shape in which approximately four rectangular poles are perpendicularly connected, and includes first to fourth poles 321, 322, 323, and 324. The first pole 321 extends in the width direction from the side surface of the container 350 or the robot guiding rail 400, and the second pole 322 extends upwardly from an end of the first pole 321. The third pole 323 extends backwardly from an end of the second pole 322, and the fourth pole 324 extends outwardly from an end of the third pole 323 in the width direction.

Since a bottom surface of the third pole 323 is a curved surface having an approximate arch shape, and a height H1 of a surface in which the third pole 323 is in contact with the fourth pole 324 is smaller than a height H2 of the fourth pole 324, so that a recess 326 having facing surfaces of the second pole 322 and the fourth pole 324 as side walls and the bottom surface of the third pole 323 as a ceiling is formed at a bottom side of the third pole 323.

A corner between a bottom surface of the fourth pole 324 and the side surface of the recess 326 may be processed to be round.

The hook latch 320 is positioned at a position corresponding to the hook portion 224, and the hook portion 224 of another moving apparatus is latched at a lower side of the recess 326 of the hook latch 320 to be accommodated when the docking is performed. However, the hook latch 320 may be a rectangular pole simply extended in the width direction.

The docking guiding rail 330 extends from the end of the hook latch 320 in the rear direction, and an end portion and a center portion thereof are supported by the frame 310. A rear end of the docking guiding rail 330 may be matched to a rear end of the robot guiding rail 400.

Referring to FIG. 16, a height of the upper surface of the docking guiding rail 330 is not constant and is changed, and the docking guiding rail 330 includes a guiding portion 332 for guiding the wedge-type roller 230 of another moving apparatus when the docking is performed.

An oblique portion 334 which declines from the rear side as it becomes closer to the front side occupies most of the guiding portion 332, and an inclination of the oblique portion 334 is smaller than that of the oblique side 264 of the triangular hole 262 of the fixing member 260.

The guiding portion 332 further includes a termination portion 336 and a start portion 338 connected to a front end and a rear end of the oblique portion 334, respectively.

The termination portion 336 rises from a connection point with the oblique portion 334 in a shape of an approximate circular arc, and the start portion 338 slightly declines in a shape of an approximate circular arc from the connection point with the oblique portion 334. The termination portion 336 is approximately positioned at a center portion of the docking guiding rail 330, and a boundary point 335 of the oblique portion 334 and the termination portion 336 is positioned at the lowest position of the guiding portion 332.

When the two moving apparatuses including the same structure are docked, the hook arm 220 and the wedge-type roller 230 of one moving apparatus are coupled with the hook latch 320 and the docking guiding rail 330 of the other moving apparatus, respectively, so that the robot guiding rails 400 of the two moving apparatuses are connected to each other. To this end, several conditions need to be satisfied. This will be described in detail with reference to FIGS. 17 to 21.

Figure 17:
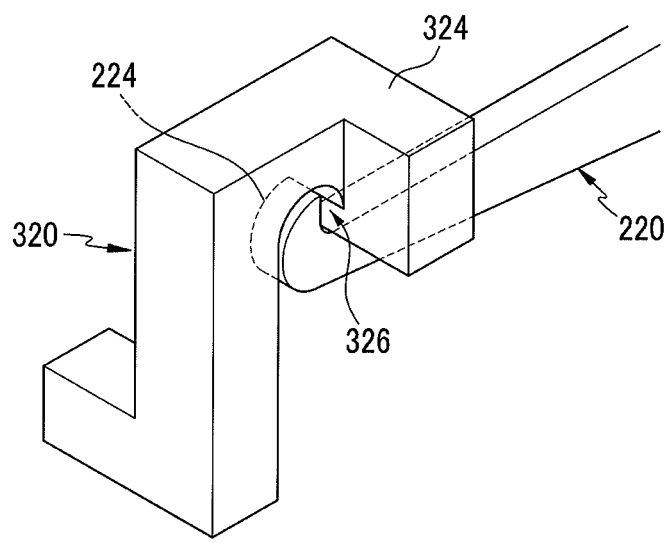
FIGS. 17 to 19 are a perspective view, a front view, and a side view illustrating a state in which the hook arm is coupled with the hook latch, respectively.
Figure 18:
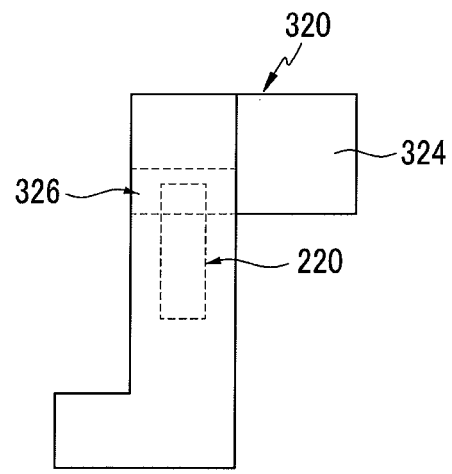
Figure 19:
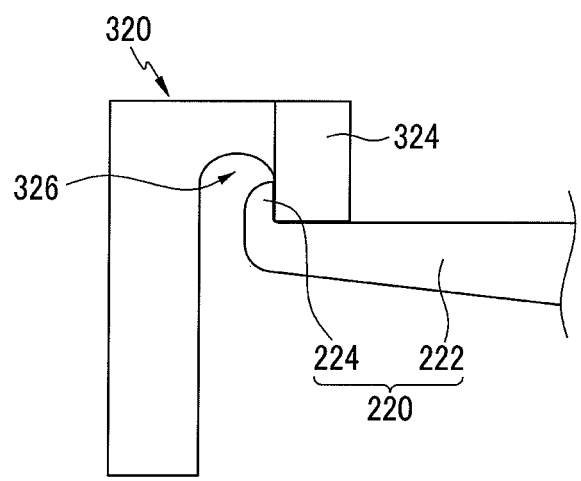
Figure 20:
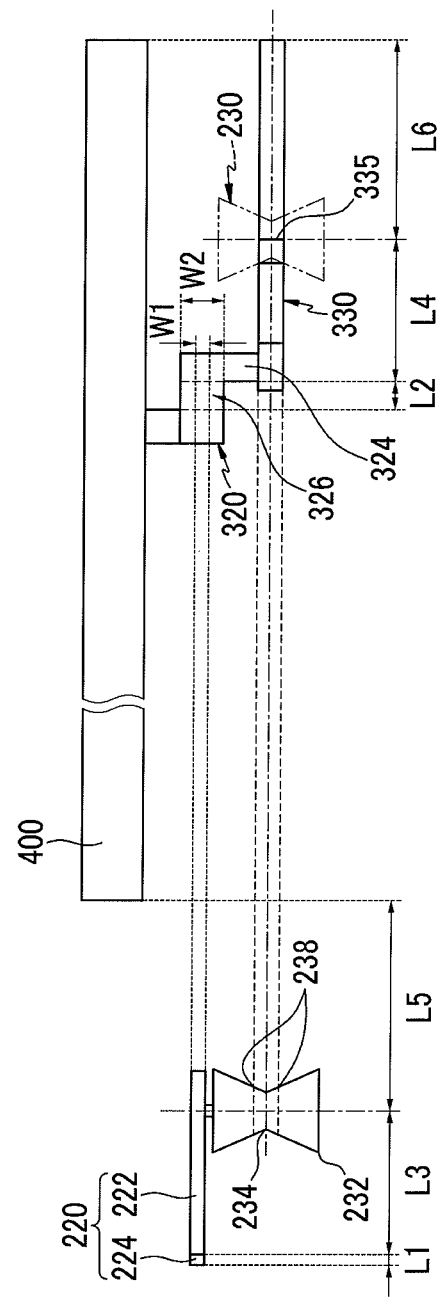
FIG. 20 is a top plan view illustrating an arrangement state of the hook arm, the wedge-type roller, the hook latch, and the docking guiding rail.
Figure 21:
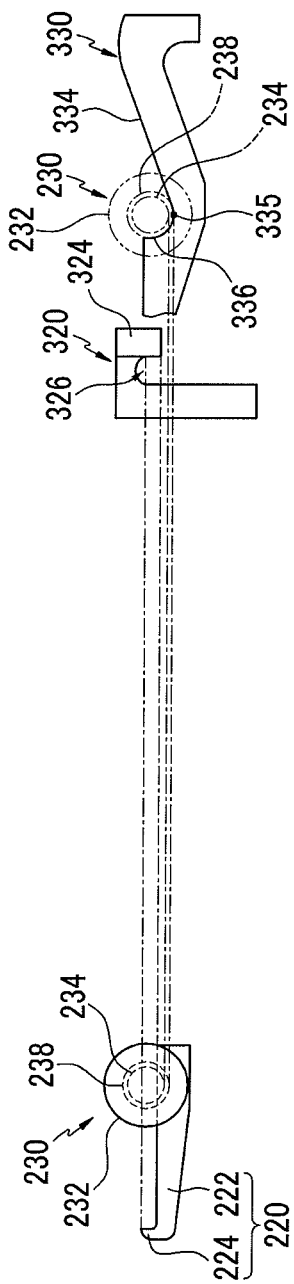
FIG. 21 is a side view illustrating an arrangement state of the hook arm, the wedge-type roller, the hook latch, and the docking guiding rail.

FIGS. 17 to 19 are a perspective view, a front view, and a side view illustrating a state in which the hook arm is coupled with the hook latch, respectively. FIG. 20 is a top plan view illustrating an arrangement state of the hook arm, the wedge-type roller, the hook latch, and the docking guiding rail. FIG. 21 is a side view illustrating an arrangement state of the hook arm, the wedge-type roller, the hook latch, and the docking guiding rail.

First, FIGS. 17 to 19 illustrate a state in which the hook portion 224 of the hook arm 220 is fitted to the hook latch 320.

In this case, the hook portion 224 is positioned inside the recess 326, and an upper surface of the hook arm 220 is in contact with the bottom surface of the fourth pole 324. When the hook portion 224 is positioned inside the recess 326, a movement in the longitudinal direction is limited, so that there may be a merit in that a coupling between the hook portion 224 and the recess 326 is not easily loosened.

Referring to FIG. 20, the hook arm 220 is aligned with the recess 326 of the hook latch 320 in the longitudinal direction. Referring to FIG. 21, a height of an upper surface of the arm portion 222 of the hook arm 220 is substantially the same as a height of the bottom surface of the fourth pole 324 of the hook latch 320.

Referring to FIG. 20, a width W1 and a length L1 of the hook portion 224 are smaller than a width W2 and a length L2 of the recess 326, respectively. Further, referring to FIG. 21, a height of an end of the hook portion 224 is substantially the same as or lower than a height of a side wall at a side of the fourth pole 324 of the recess 326. Here, the width W2 and the length L1 of the recess 326 are opposite to a general meaning, but are expressed as above in order to meet the aforementioned definitions of "the width direction" and "the longitudinal direction". A width, a length, and a height of another portion may be different from a general meaning for the same reason.

FIGS. 20 and 21 illustrate a state where the wedge-type roller 230 is fitted on the docking guiding rail 330, and the narrowest center circumference 234 in the wedge-type roller 230 fails to be in contact with the docking guiding rail 330 and a contact portion 238 slightly spaced apart from the center circumference 234 is in contact with the docking guiding rail 330 due to a width of the docking guiding rail 330. Accordingly, a diameter of a circular arc of the termination portion 336 of the docking guiding rail 330 may be the same as a diameter of the contact portion 238 of the wedge-type roller 230.

Referring to FIG. 20, the wedge-type roller 230 and the docking guiding rail 330 are arranged in the longitudinal direction, and referring to FIG. 21, a height of a lowermost portion of the contact portion 238 of the wedge-type roller 230 may be substantially the same as a height of the boundary point 335 of the oblique portion 334 and the termination portion 336 in the docking guiding rail 330.

In the meantime, referring to FIG. 20, a distance L3 from a boundary point of the hook portion 224 and the arm portion 222 in the hook arm 220 to a rotation axis of the wedge-type roller 230 in the longitudinal direction may be substantially the same as a distance L4 in the longitudinal direction from a side wall at a side of the fourth pole 324 of the recess 326 in the hook latch 320 to the boundary point 335 of the oblique portion 334 and the termination portion 336 in the docking guiding rail 330.

In other words, a distance from the hook portion 224 to the rotation axis of the wedge-type roller 230 in the longitudinal direction may be schematically the same as a distance from the hook latch 320 to the lowest point of the upper surface of the docking guiding rail 330 (or the lowest point of the guiding portion 332, which is the same as the boundary point 335) in the longitudinal direction.

Further, a distance L5 from the rotation shaft of the wedge-type roller 230 to a front end of the robot guiding rail 400 in the longitudinal direction may be substantially the same as a distance L6 from the lowest point of the upper surface of the docking guiding rail 330 to the rear end of the robot guiding rail 400 in the longitudinal direction.

Then, a docking operation of the moving apparatuses according to the exemplary embodiment will be described in detail with reference to FIGS. 22 to 27 together with FIGS. 1 and 2.

Figure 22:
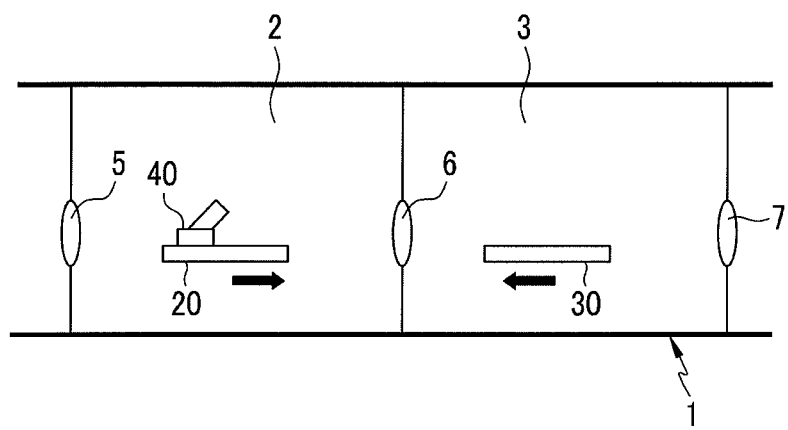
FIGS. 22 and 23 are schematic diagrams sequentially illustrating a docking operation of two moving apparatuses according to the exemplary embodiment.
Figure 23:
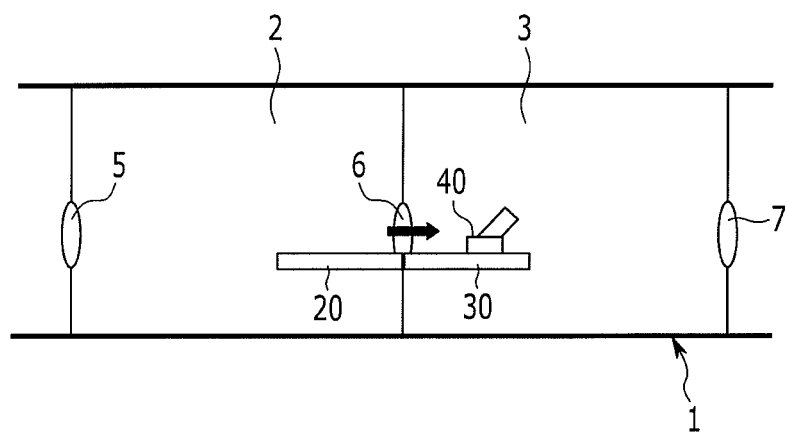

FIGS. 22 and 23 are schematic diagrams sequentially illustrating a docking operation of the two moving apparatuses according to the exemplary embodiment. FIGS. 24 to 27 are schematic side views illustrating a docking process between the two moving apparatuses in detail. Relevant portions are slightly modified and illustrated in FIGS. 24 to 27 for easy understanding of the docking process.

The ship block 1 is divided in a plurality of cells 2 and 3, for example a left cell 2 and a right cell 3, and the moving apparatuses 20 and 30 are installed in the cells 2 and 3, respectively. Entrances 5, 6, and 7 through which the working robot 40 and the moving apparatuses 20 and 30 may pass are formed between the ship block 1 and the outside and between the cells 2 and 3.

Referring to FIG. 22, in order to move the working robot 40 mounted on the moving apparatus 20 of the left cell 2 to the moving apparatus 30 of the right cell 3, the two moving apparatuses 20 and 30 are moved to the entrance 6 between the two cells 2 and 3.

Referring to FIG. 23, the moving apparatuses 20 and 30 of the two cells 2 and 3 are docked through the entrance 6, and then the working robot 40 is moved to the moving apparatus 30 of the right cell 3 to be mounted.

The docking is performed by using the hook latch 320 and the docking guiding rail 330 of the left moving apparatus 20 and the docking module 200 of the right moving apparatus 30, and a detailed process thereof will be described.

Figure 24:
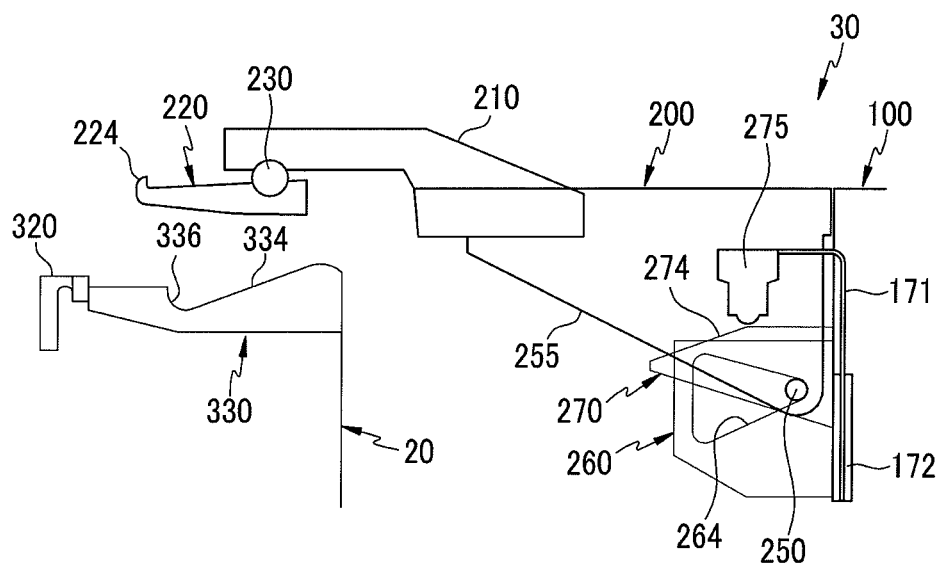
FIGS. 24 to 27 are schematic side view illustrating a docking process between two moving apparatuses in detail.

First, referring to FIG. 24, the right moving apparatus 30 approaches from a higher position than the left moving apparatus 20 when the two moving apparatuses 20 and 30 approach, so that the docking module 200 of the right moving apparatus 30 is positioned on the hook latch 320 and the docking guiding rail 330 of the left moving apparatus 20.

In this case, a distance between the two moving apparatuses 20 and 30 is adjusted so that the hook portion 224 of the hook arm 220 is positioned in a rear side of the hook latch 320 and the wedge-type roller 230 is positioned on the oblique portion 334 of the docking guiding rail 330.

The docking module 200 of the right moving apparatus 30 (to strictly speak, the moving part of the docking module 200, but the docking module 200 is expressed for convenience of the description) is in close contact with the main body 100, which means a state where the wire 171 is wound around the winch 172 by tightly pulling the wire 171.

In this case, the supporting roller 250 is in a state where the supporting roller 250 is in close contact with a round corner between the upper side and the bottom side (or the oblique side 264) of the triangular hole 262 formed in the fixing member 260, and the ball caster 275 is in a state where the ball caster 275 slightly protrudes from an upper surface of the sliding member 270.

Figure 25:
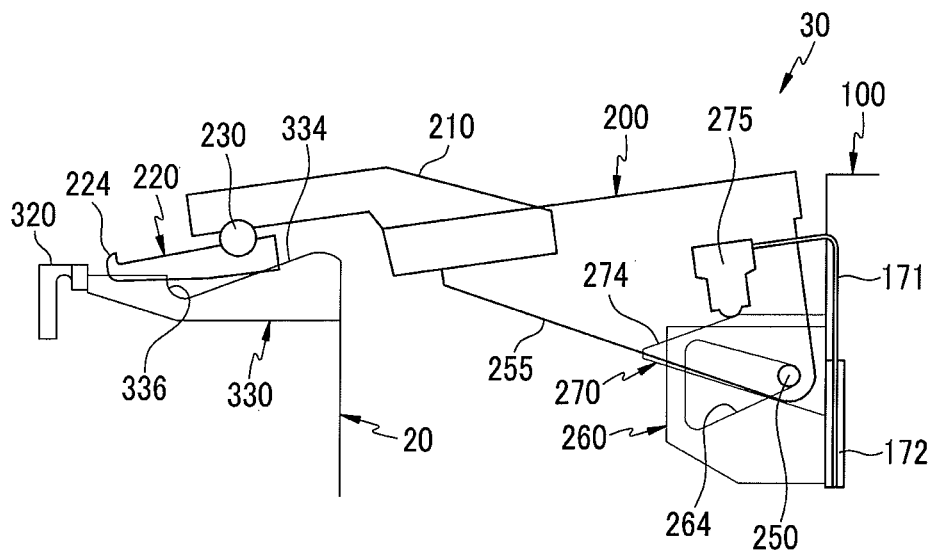

Referring to FIG. 25, the wire 171 wound around the winch 172 is started to be loosened. Then, since a center of gravity of the docking module 200 is in a front side of the supporting roller 250, the docking module 200 is inclined in a front side while rotating in a counterclockwise direction with respect to the supporting roller 250, and thus the hook arm 220 and the wedge-type roller 230 move down while slightly advancing to the front side. In this case, the ball caster 275 is in contact with the oblique surface 274 of the sliding member 270, and starts to slide down.

Figure 26:
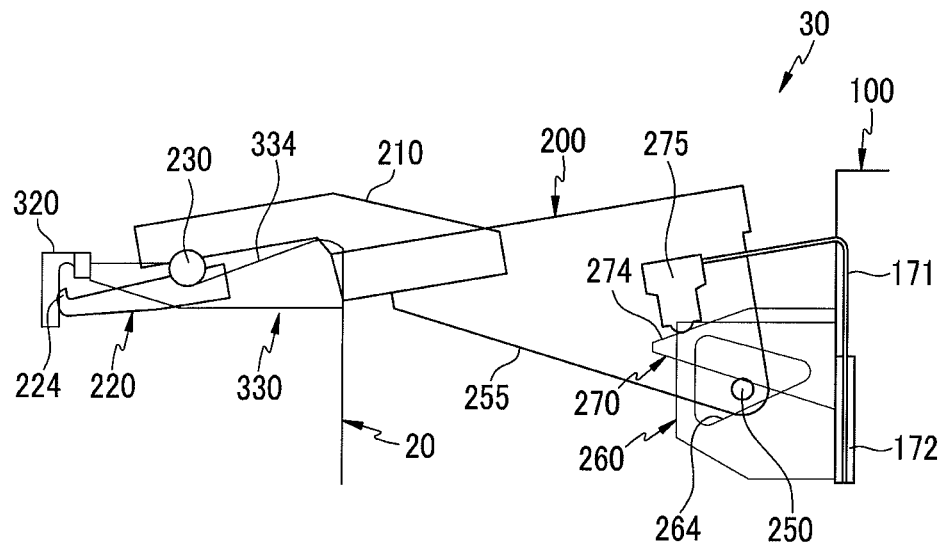

Referring to FIG. 26, when the wire 171 is further loosened, the docking module 200 is further inclined and the wedge-type roller 230 of the right moving apparatus 30 is in contact with the docking guiding rail 330 of the left moving apparatus 20.

When the wire 171 is further loosened after the wedge-type roller 230 is in contact with the docking guiding rail 330, the docking module 200 cannot rotate in the counterclockwise direction any longer, and rolls or slides down along the oblique portion 334 of the docking guiding rail 330 and the oblique surface 274 of the sliding member 270, and the supporting roller 250 is simultaneously floated in the air.

The reasons is that the gradients of the oblique portion 334 of the docking guiding rail 330 and the oblique surface 274 of the sliding member 270 are smaller than the gradient of the oblique side 264 of the triangular hole 262 of the fixing member 260.

In this case, support points of a load of the docking module 200 are two wedge-type rollers 230 and the ball caster 275, so that the load of the docking module 200 is three-point supported, and thus, the wedge-type roller 230 having a concave center may easily correct mis-alignment in the horizontal direction.

The docking module 200 continuously moves along the docking guiding rail 330 and the sliding member 270 until the wedge-type roller 230 meets the termination portion 336 at the end of the oblique portion 334 of the docking guiding rail 330.

When the wedge-type roller 230 meets the termination portion 336 so that the wedge-type roller 230 cannot advance any longer, the docking module 200 does not move any longer even though the wire 171 is further loosened, so that it is not necessary to further loose the wire 171.

Figure 27:
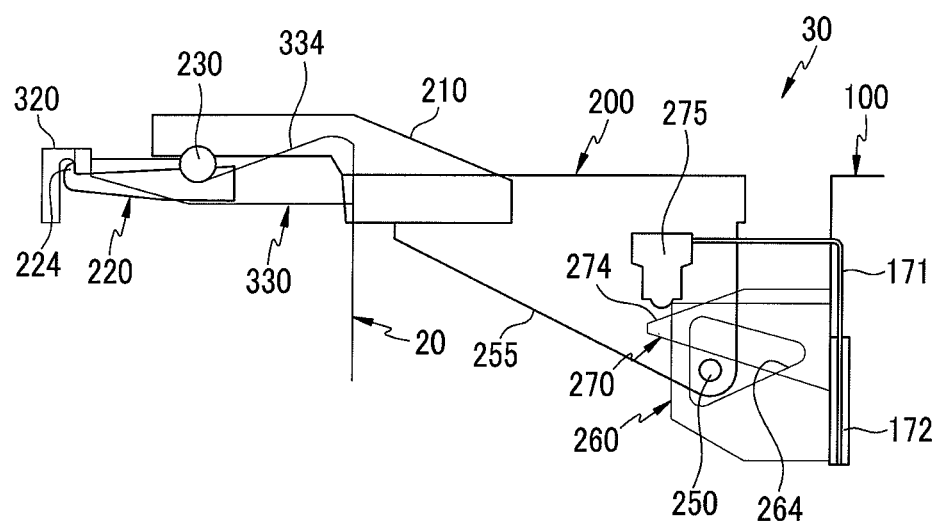

Referring to FIG. 27, the main body 100 of the right moving apparatus 30 moves downwardly, so that the two moving apparatuses 20 and 30 have the same height.

Then, the docking module 200 rotates in a clockwise direction with respect to the wedge-type roller 230, and the hook arm 220 is in contact with the hook latch 320.

When the hook latch 320 is completely latched in the hook arm 220, the rotation of the docking module 200 stops, and the main body 100 of the right moving apparatus 30 slightly further moves down even after the stop of the rotation of the docking module 200 and then stops.

In this case, the ball caster 275 is in a state where the ball caster 275 is floated in the oblique surface 274 of the sliding member 270, and a load of the docking module 200 is supported by the wedge-type roller 230 and the hook arm 220.

Through this, the robot guiding rail (not illustrated) of the left moving apparatus 20 and the robot guiding rail (not illustrated) of the docking module 200 of the right moving apparatus 30 are connected to each other in parallel.

Finally, when the main body 100 is in close contact with the docking module 200 by maximally winding the wire 171 while moving the main body 100 toward the docking module 200, the docking is completed, and the robot guiding rails 400 of the two moving apparatuses 20 and 30 are aligned while being connected with each other.

Here, when moving the main body 100, the position of the main body 100 is adjusted by loosening or winding the wire 161 as illustrated in FIG. 1.

As described above, in the exemplary embodiment of the present invention, the docking between the moving apparatuses 20 and 30 may be conveniently and rapidly performed by using gravity of the docking module 200, the spaces occupied by the parts necessary for the docking are small, and docking performance is also excellent.

The operation of loosening or winding the wires 161 and 171 among the aforementioned several operations is performed by an external control, and the control may be performed through the control unit 140 illustrated in FIG. 3.

In the exemplary embodiment, it is described that the moving apparatus 10 is divided into three parts of the main body 100, the docking module 200, and the rotary module 300, but the rotary module 300 may be omitted. In this case, the hook latch 320 and the docking guiding rail 330 may be installed around the rear end of the main body 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the moving apparatus according to the exemplary embodiment of the present invention, the docking is easily performed, and the moving apparatus occupies a small space, so that it is possible to decrease a time for docking and improve docking performance.

The invention claimed is:

1. A moving apparatus on which a working robot working in a working space is mountable, wherein the moving apparatus is to connect with another moving apparatus, the moving apparatus comprising:
a pair of robot guiding rails extended in a first direction to guide the working robot, each robot guiding rail including a first end and a second end as both ends;
a pair of first rollers included at a vicinity of the first end of the robot guiding rail, each first roller having a rotation axis in a second direction perpendicular to the first direction;
a pair of hook arms extending in the first direction at the vicinity of the first end of the robot guiding rail, each hook arm including a hook facing upwardly;
a pair of hook latches included at a vicinity of the second end of the robot guiding rail, each hook latch corresponding to a hook of a hook arm of the other moving apparatus; and
a pair of docking guiding rails extending in the first direction at the vicinity of the second end of the robot guiding rail, each docking guiding rail having an upper surface and configured to align with a first roller of the other moving apparatus,
wherein when connecting with the other moving apparatus, each of the pair of hook latches is to engage with the corresponding hook of the other moving apparatus and the upper surface of each docking guiding rail is to guide the first roller of the other moving apparatus.

2. The moving apparatus of claim 1, wherein:
the first roller is shaped like a wedge having a concave center.

3. The moving apparatus of claim 2, wherein:
the upper surface of the docking guiding rail includes a guiding portion for limiting a position of the first roller in the first direction.

4. The moving apparatus of claim 3, wherein:
the guiding portion includes
an oblique portion declining from the second end of the robot guiding rail in a direction toward the first end; and
a termination portion starting from an end of the oblique portion and rising upwardly.

5. The moving apparatus of claim 4, wherein:
the termination portion has a shape of a circular arc.

6. The moving apparatus of claim 5, wherein:
a height of a boundary point of the termination portion and the oblique portion is smallest in the guiding portion.

7. The moving apparatus of claim 6, wherein:
a distance from the hook to a rotation axis of the first roller in the first direction is the same as a distance from the hook latch to the boundary point in the first direction, and
a distance from the rotation axis of the first roller to a front end of the robot guiding rail in the first direction is the same as a distance from the boundary point to a rear end of the robot guiding rail in the first direction.

8. The moving apparatus of claim 7, wherein:
the first roller and the hook arm protrude outwardly from the first end of the robot guiding rail in the first direction, and the hook latch and the docking guiding rail are not separated from the second end of the robot guiding rail in the first direction.

9. The moving apparatus of claim 8, wherein:
the hook latch has a recess receiving the hook of the hook arm.

10. The moving apparatus of claim 8, comprising:
a main body; and
a first module coupled with the main body, and comprising the first roller and the hook arm,
wherein the robot guiding rail includes a first portion and a second portion formed on upper surfaces of the main body and the first module, respectively.

11. The moving apparatus of claim 10, wherein:
the first module includes:
a fixing part fixed to the main body; and
a moving part fixed to the second portion of the robot guiding rail and movable with respect to the main body, wherein the moving part comprises the first roller and the hook arm.

12. The moving apparatus of claim 11, wherein:
the main body comprises:
a wire having one end fixed to the moving part;
a winch configured to wind the wire; and
a motor configured to rotate the winch.

13. The moving apparatus of claim 12, wherein:
the fixing part comprises:
a pair of fixing members fixed to a side surface of the main body, and including a triangular hole having an oblique side declining as becoming far from the main body; and
a sliding member positioned between the pair of fixing members, and including an oblique surface declining as becoming far from the main body, and
the moving part further comprises:
a pair of second rollers passing through the triangular hole of the fixing member, and having a rotation axis in the second direction; and
a ball caster installed at a position corresponding to the sliding member.

14. The moving apparatus of claim 13, wherein:
a center of gravity of the moving part is positioned between the first roller and the second roller.

15. The moving apparatus of claim 14, wherein:
the oblique side of the triangular hole has a larger inclination than those of the oblique surface of the sliding member and the oblique portion of the docking guiding rail.

16. The moving apparatus of claim 15, further comprising:
a second module coupled with the main body at an opposite side to the first module with respect to the main body, and comprising the hook latch and the docking guiding rail,
wherein the robot guiding rail further include a third portion included in an upper surface of the second module.

17. The moving apparatus of claim 16, wherein:
the robot guiding rail further include a fourth portion included in a bottom surface of the main body,
the second module is rotatable with respect to the main body, and
when the second module rotates with respect to the main body by 180 degrees, the third portion and the fourth portion of the robot guiding rail are connected to each other.

* * * * *